(12) United States Patent
Null et al.

(10) Patent No.: US 6,598,918 B1
(45) Date of Patent: Jul. 29, 2003

(54) SYNCHRONIZED GRIPPER JAWS

(75) Inventors: Lyle A. Null, Markle, IN (US); Gordon Kistler, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 09/389,257

(22) Filed: Sep. 3, 1999

(51) Int. Cl.⁷ .............................................. B25J 15/08
(52) U.S. Cl. ...................... 294/88; 294/119.1
(58) Field of Search .................. 294/88, 119.1, 294/907; 901/32–39; 269/32, 34, 233, 234; 279/110, 121; 414/729, 730, 741, 751

(56) References Cited

U.S. PATENT DOCUMENTS

| | | | |
|---|---|---|---|
| 4,577,898 A | * 3/1986 | Nusbaumer et al. | 294/88 |
| 4,591,199 A | 5/1986 | Zajac | 294/88 |
| 4,593,948 A | * 6/1986 | Borcea et al. | 294/88 |
| 4,607,873 A | * 8/1986 | Nusbaumer et al. | 294/106 |
| 4,611,846 A | * 9/1986 | Feiber et al. | 294/88 |
| 4,647,100 A | 3/1987 | Lessway | 294/119.1 |
| 4,653,793 A | * 3/1987 | Guinot et al. | 294/86.4 |
| 4,697,839 A | 10/1987 | Fischer | 294/115 |
| 4,723,806 A | 2/1988 | Yuda | 294/119.1 |
| 4,765,669 A | 8/1988 | Meier | 294/119.1 |
| 4,768,821 A | 9/1988 | Hucul et al. | 294/119.1 |
| 4,865,375 A | 9/1989 | Laub et al. | 294/88 |
| 4,892,344 A | 1/1990 | Takada et al. | 294/88 |
| 4,913,481 A | * 4/1990 | Chin et al. | 294/119.1 |
| 5,090,757 A | 2/1992 | Huber et al. | 294/88 |
| 5,125,708 A | * 6/1992 | Borcea et al. | 294/88 |
| 5,163,729 A | 11/1992 | Borcea et al. | 294/119.1 |
| 5,529,359 A | 6/1996 | Borcea et al. | 294/119.1 |
| 5,595,413 A | 1/1997 | McGeachy et al. | 294/88 |
| 5,620,223 A | 4/1997 | Mills | 294/88 |
| 5,657,973 A | 8/1997 | Zajac, Jr. et al. | 269/34 |
| 5,755,475 A | 5/1998 | Zajac, Jr. | 294/88 |
| 5,839,770 A | * 11/1998 | Zajac, Jr. et al. | 294/88 |
| 5,967,581 A | * 10/1999 | Bertini | 294/119.1 |
| 6,123,375 A | * 9/2000 | Fussey et al. | 294/88 |
| 6,309,003 B1 | * 10/2001 | Bertini | 294/88 |

FOREIGN PATENT DOCUMENTS

| | | | | |
|---|---|---|---|---|
| DE | 0239751 | * | 10/1986 | 294/119.1 |
| SU | 1470645 | * | 4/1989 | 294/119.1 |

* cited by examiner

Primary Examiner—Dean J. Kramer
Assistant Examiner—Paul T. Chin
(74) Attorney, Agent, or Firm—Barnes & Thornburg

(57) ABSTRACT

A synchronizing mechanism for parallel gripper and clamp assemblies which includes one or more synchronizing elements that are coupled to elongate jaw guides which guide the parallel reciprocal motion of opposed jaw members. According to one embodiment, a single synchronizing element is used which includes slots on opposite sides. The single synchronizing element is coupled to the elongate jaw guides by pins or other coupling structure or elements which are positioned in the slots and are coupled to the elongate jaw guides. According to another embodiment two synchronizing elements which pivot or rotate about a common axis and which slide relative to one another are used. In other embodiments the synchronizing mechanism can include a rotating element and shuttle elements which are configured to slide along or within the rotating element in slots or through-holes provided therein.

7 Claims, 5 Drawing Sheets

SYNCHRONIZED GRIPPER JAWS

TECHNICAL FIELD

The present invention relates to fluid actuated gripper and clamp mechanisms for engaging, transporting, handling and releasing various workpieces and articles by a pair of opposed movable jaw members. More particularly, the present invention is directed to synchronizing mechanisms for fluid actuated clamps and grippers.

BACKGROUND ART

Clamp and gripper devices are well known and widely used in a variety of applications, including workpiece machining, component assembly, component and workpiece testing, packaging, shipping, etc. Clamp and gripper devices are typically provided at the ends of robotic arms, or on linear or non-linear transfer devices which are positioned between two or more work stations.

Parallel clamp and gripper devices include jaw members which move linearly between open and closed positions. Examples of parallel clamp and gripper devices are found in U.S. Pat. No. 5,755,475 to Zajac, Jr., U.S. Pat. No. 5,620,223 to Mills, U.S. Pat. No. 5,657,973 to Zajac, Jr. et al., U.S. Pat. No. 5,595,413 to McGeachy et al., U.S. Pat. No. 5,529,359 to Borcca et al., U.S. Pat. No. 5,163,729 to Borcea et al., U.S. Pat. No. 5,090,757 to Huber et al, U.S. Pat. No. 4,892,344 to Takada et al., U. S. Pat. No. 4,768,821 to Hucul et al., U.S. Pat. No. 4,723,806 to Yuda, U.S. Pat. No. 4,647,100 to Lessway and U.S. Pat. No. 4,591,199 to Zajac. U.S. Pat. No. 4,723,806 to Yuda, U.S. Pat. No. 4,647,100 to Lessway and U.S. Pat. No. 4,591,199 to Zajac.

Parallel clamp and gripper devices which involve the use of opposed fluid actuated pistons to drive opposed jaw members can independently drive the jaw members at different speeds and/or under different forces if the pneumatic or hydraulic systems are not properly balanced. In some circumstances wherein it is desired to have the opposed jaws close at the same speed and/or under the same degree of force, synchronizing mechanisms can be included in parallel clamp and gripper devices. Of the above listed U.S. Patents, most include some type of synchronizing mechanism.

The present invention provides synchronizing mechanisms for fluid actuated clamps and grippers that provide a number of advantages over the prior art.

DISCLOSURE OF THE INVENTION

According to other features, characteristics, embodiments and alternatives of the present invention which will become apparent as the description thereof proceeds below, the present invention provides a synchronizing assembly that includes at least two synchronizing elements which are slidable with respect to one another, configured to move about a common axis which is located between parallel elongate members of a gripper assembly, and which include structure for coupling outer ends thereof to the elongate members.

The present invention further provides a gripper assembly that includes:

a body;

at least one piston provided within a chamber within the body for opposed reciprocal movement therein;

a pair of opposed jaw members with one of the pair of opposed jaw members located at opposite ends of the body and coupled to one of the at least one piston for reciprocal movement therewith between open and closed positions;

two elongate jaw guide members each coupled to one of the pair of opposed jaw members; and a synchronizing assembly couple to each of the two jaw guide members by mechanical coupling means which only extend into the synchronizing assembly and into the two jaw guide members.

BRIEF DESCRIPTION OF DRAWINGS

The present invention will be described hereafter with reference to the attached drawings which are given as non-limiting examples only, in which.

BEST MODE FOR CARRYING OUT THE INVENTION

The present invention is directed to fluid actuated gripper and clamp mechanisms for engaging, transporting, handling and releasing various workpieces and articles by a pair of opposed movable jaw members. More particularly, the present invention is directed to synchronizing mechanisms for fluid actuated clamps and grippers. The synchronizing mechanisms of the present invention include synchronizing elements that are coupled to jaw guide members. The jaw guide members move parallel to one another in a body which also houses one or more pistons that drive opposed jaw members in a reciprocal manner. The jaw guide members are coupled to the jaw members and used to guide the parallel reciprocal movement of the opposed jaw members.

According to one embodiment, the synchronizing elements are pivotal or rotatable and include slots in opposed sides thereof. The slots can be parallel to one another or aligned (coaxial) with one another. The pivotal or rotatable element can be substantially rectangular or round or can have any convenient shape. The slots in the pivotal or rotatable element are configured to couple to the jaw guides.

In other embodiments the synchronizing mechanisms can include two synchronizing elements which pivot or rotate about a common axis and which slide relative to one another. The synchronizing elements can have different sizes and be telescopic or nest together, i.e. one synchronizing element can be received within the structure of the other so that they can slide toward and away from one another. In other embodiments the two synchronizing elements can be identically shaped and configured to interlock or engage one another in a sliding manner.

In further embodiments of the present invention, the synchronizing mechanism can include a rotating element and shuttle elements which are configured to slide along or within the rotating element in slots or through-holes provided therein.

The synchronizing mechanisms of the present invention can be designed to be removable and replaceable. In this regard, they can be positioned in a recess in the body of a clamp or gripper which recess is closed by a cover that can be removable. The synchronizing mechanisms can be deactivated by removing the cover and lifting the synchronizing element(s) out of engagement with the jaw guide members.

The synchronizing mechanisms of the present invention can ensure that the opposed jaw members close and open together at substantially the same speed and under a balanced force so that they can be used to accurately clamp onto or grip a variety of objects.

According to the present invention, the synchronizing mechanisms can be used to drive one of the opposed jaw members. For example, one side of the synchronizing mechanism could be coupled to a single piston which drives one jaw member reciprocally. The other side of the synchronizing mechanism could be coupled to the other jaw member and used to drive the other jaw member without the use of a second piston.

Figure 1:
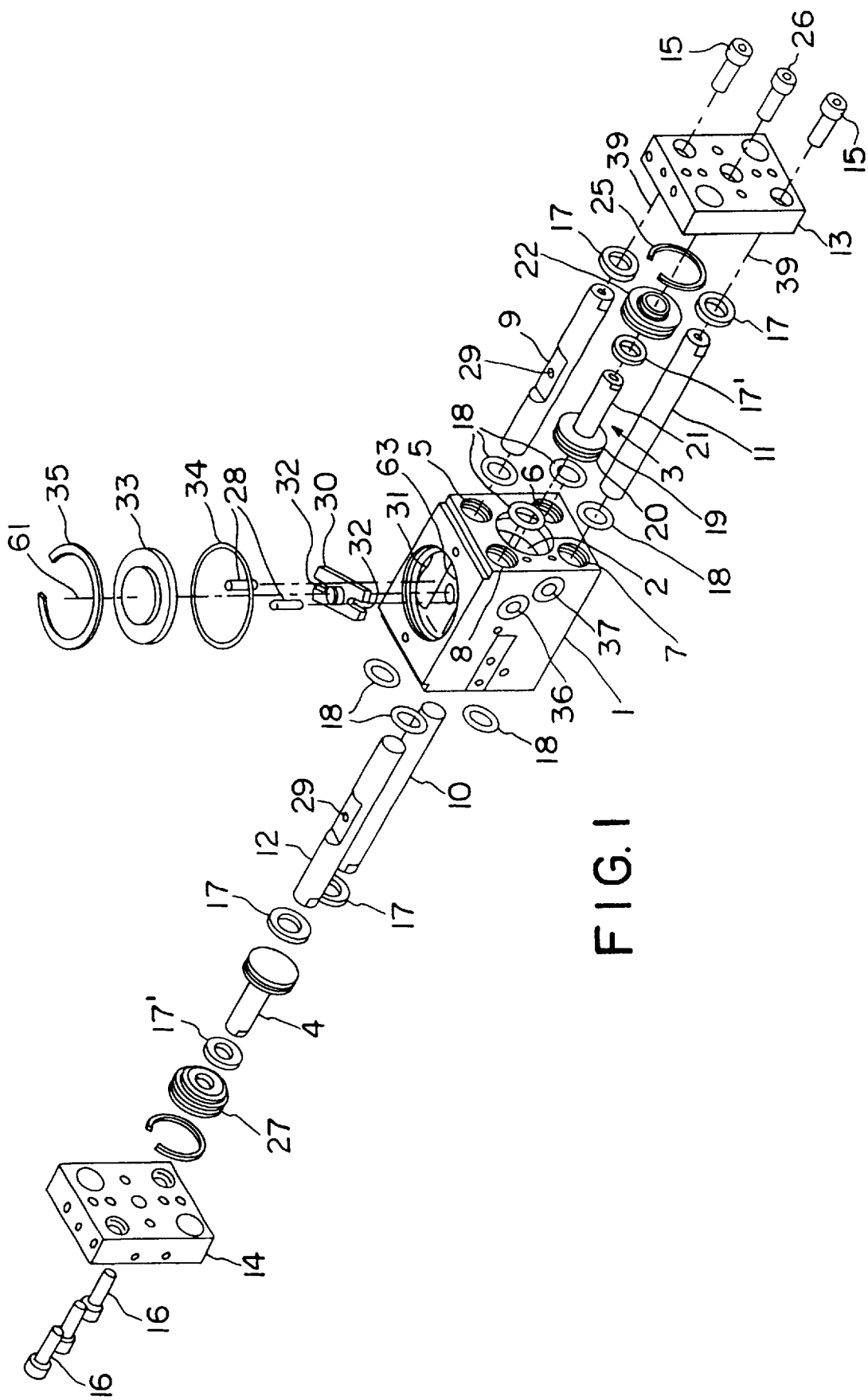
FIG. 1 is an exploded perspective view of a parallel gripper assembly according to one embodiment of the present invention.

FIG. 1 is an exploded perspective view of a parallel gripper assembly according to one embodiment of the present invention. The gripper assembly includes a main body 1 which has a central bore 2 which receives opposed piston elements 3 and 4. The main body 1 further includes a plurality of through-bores 5, 6, 7, and 8 which receive jaw guides 9, 10, 11 and 12. Two opposed jaw members 13 and 14 are provided at opposite ends of the main body 1 and are attached to a pair of the jaw guides as follows. Two of the jaw guides 9 and 11 which are diagonally opposed in the main body 1 are coupled to jaw member 13 by mechanical fasteners 15 as depicted. The other pair of diagonally opposed jaw members 10 and 12 are coupled to jaw member 14 by similar mechanical fasteners 16. Shock pads 17 can be provided on the jaw guides 9, 10, 11 and 12 adjacent the jaw members 13 and 14 to absorb shock between the jaw members 13 and 14 and main body 1. Annular seals such as o-rings 18 can be provided at each end of through-bores 5, 6, 7 and 8 to receive the jaw guides 9, 10, 11 and 12 in a sealing relationship. An axis 39 is shown disposed through each of the jaw guides 9, 11.

Piston 3 includes a head portion 19 with an annular seal 20 on a peripheral surface thereof and a rod portion 21. Piston 3 is secured in central bore 2 by a retainer assembly 22 which includes an outer peripheral seal 23 which seals against the inner surface of central bore 2, and an inner seal 24 that seals against piston rod 21 as it slides through the retainer assembly 22. FIG. 1 depicts a retainer ring 25 that can be used to secure retainer assembly 22 in main body 1. A mechanical fastener 26 is used to secure jaw member 13 to rod 21 of piston 3 for reciprocal movement therewith. Shock pad 17' can be provided between retainer assembly 22 and piston 3 to absorb shock when piston 3 is driven into retainer assembly 22. Piston 4, retainer assembly 27, and jaw member 14 shown on the opposite side of main body 1 in FIG. 1 are similarly configured and coupled/assembled together.

An upper one of each pair of the diagonally opposed jaw guides 9 and 12 includes or receive a pin 28 which extends upwardly therefrom at a intermediate position along the jaw guides 9 and 12. Pins 28 can be received in a bore 29 provided in each of the jaw guides 9 and 12 as depicted. The pins 28 are received opposite ends of a synchronizing element 30 which is rotatably coupled within a recess 31 provided in the top of main body 1. Synchronizing element 30 is rotatable about axis 61. Synchronizing element can be an elongated element with aligned slots 32 in each end that receive pins 28. The center of synchronizing element 30 can include a protruding hub that is received in a bore centrally located in recess 31. The gripper assembly shown in FIGS. 1 and 2 also comprises a partition 63. In an alternative embodiment, the synchronizing element 30 can have a central through-hole that can be positioned over a pin that projects upwardly from recess 31. According to an alternative embodiment of the present invention, the outer ends of the synchronizing elements can include pins which are received in bores provided in the jaw guides 9 and 12. It is noted that the synchronizing element 30 could be provided with closed ended slots instead of open ended slots.

The gripper assembly includes a cover 33 for recess 31. As depicted, a seal element e.g. an o-ring 34 can be used in conjunction with cover 33 to seal recess 31. The cover 33 depicted in FIG. 1 is held in position by a retainer 35. According to other embodiments, the cover 33 could be removably secured in or over recess 31 by any suitable mechanical means. Designing the cover 33 to be easily removed would allow the synchronizing element 30 to be removed and/or replaced. In some situations, one might not want to use the synchronizing mechanism. Removing the synchronizing element 30 would be an easy way to disable the synchronizing mechanism.

Figure 2:
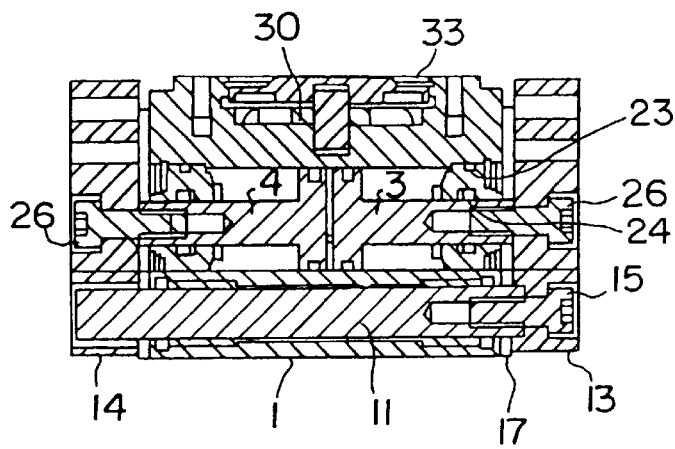
FIG. 2 is a cross-sectional side view of the parallel gripper assembly of FIG. 1.

FIG. 2 is a cross-sectional side view of the parallel gripper assembly of FIG. 1. FIG. 2 depicts how shock pad 17 is positioned on jaw guide 11 between main body 1 and jaw member 13. The other shock pads are similarly positioned on their respective jaw members. FIG. 2 also depicts how mechanical fastener 15 is used to secure jaw member 13 to jaw guide 11 and how mechanical fasteners 26 are used to secure jaw members 13 and 14 to pistons 3 and 4. It is noted that fluid ports 36 and 37 shown in FIG. 1 allow for hydraulic or pneumatic fluids to enter central bore 2 and drive pistons 3 and 4 in a conventional manner.

In operation, the synchronizing element 30 of FIG. 1 rotates in opposite directions as jaw guides 9 and 12 move inward and outward with respect to main body 1. The movement of jaw guides 9 and 12 is synchronized by the rotation of synchronizing element 30 and the cooperation of pins 28 which are received in slots 32 of synchronizing element 30.

Figure 3:
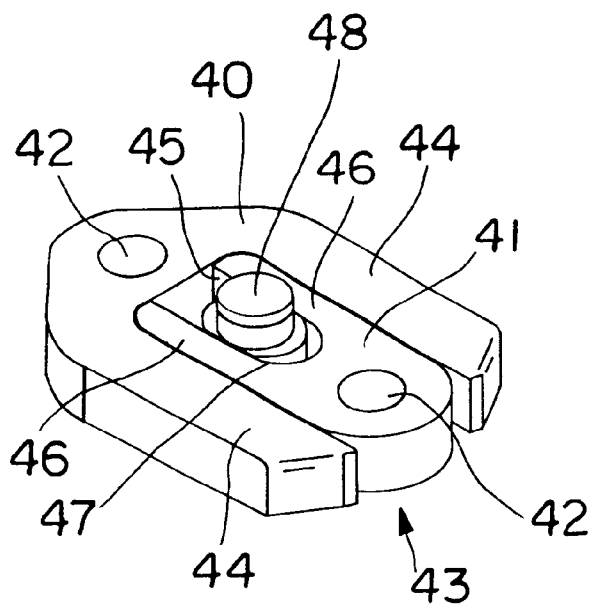
FIG. 3 is a perspective view of a synchronizing mechanism according to an alternative embodiment of the present which depicts the mechanism in a closed position.
Figure 4:
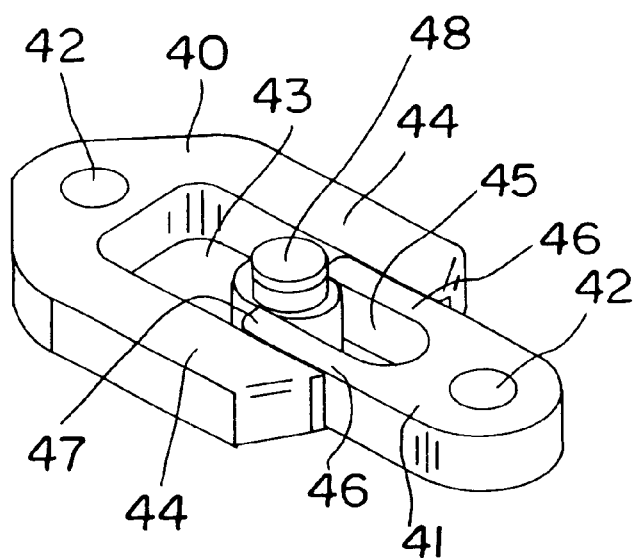
FIG. 4 is a perspective view of the synchronizing mechanism of FIG. 3 in an open or expanded position.

FIG. 3 is a perspective view of a synchronizing mechanism according to an alternative embodiment of the present which depicts the mechanism in a closed position. FIG. 4 is a perspective view of the synchronizing mechanism of FIG. 3 in an open or expanded position. The synchronizing mechanism of FIG. 3 includes outer 40 and inner 41 synchronizing elements which can be nested together and slide relative to one another. Each of the outer 40 and inner 41 synchronizing elements has a U-shaped structure defined by a base and two parallel arms which extend outwardly from the base. Each of the outer 40 and inner 41 synchronizing elements has a through-hole 42 in its base. As discussed below, through-holes 42 are coupled to pins 28 or other coupling structure provided on jaw guides 9 and 12.

The outer synchronizing element 40 has an open ended slot 43 which is defined between arm members 44, which slot 43 has an inner width that is approximately equal to the outer width of inner synchronizing element 41. The inner synchronizing element 41 has an open ended slot 45 which is defined between arm members 46, which slot 45 has an inner width that is approximately equal to the diameter of pivot pin bushing 47 which is provided on pin 48 in a recess of the main body of the gripper assembly. In an alternative embodiment the pin 48 and pivot pin bushing 47 could comprise and integral structure.

Figure 5A:
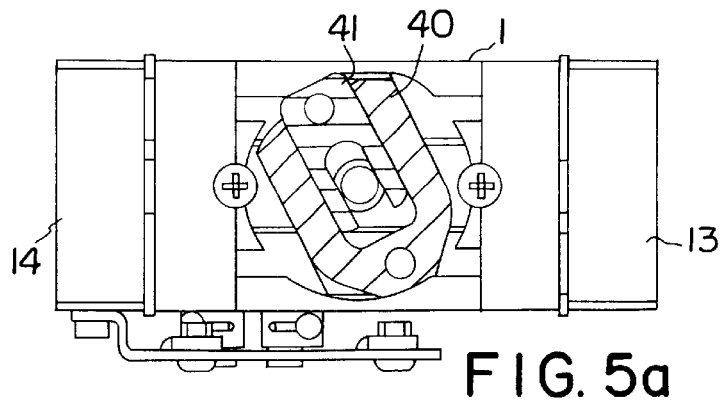
FIGS. 5a–5d are top planar views which depict the manner in which the synchronizing mechanism of FIGS. 3 and 4 operate.
Figure 5B:
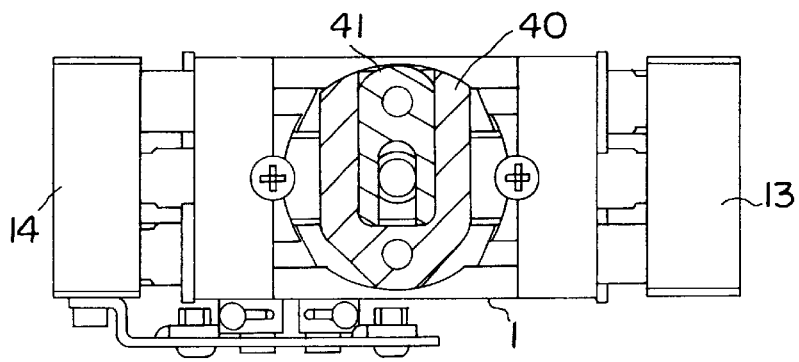
Figure 5C:
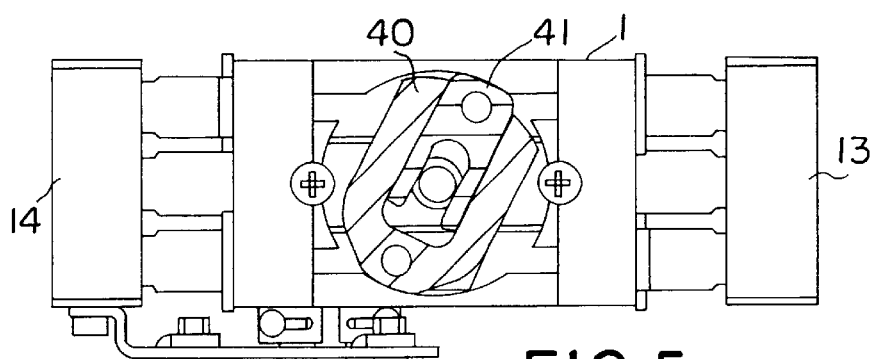
Figure 5D:
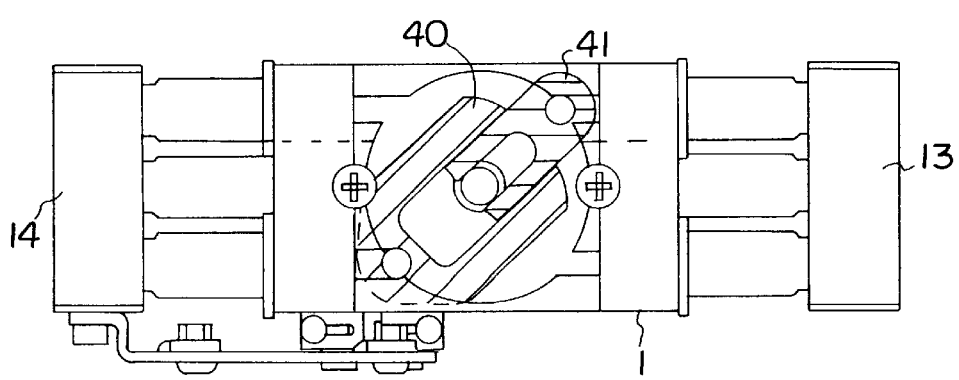

FIGS. 5a–5d are top planar views which depict the manner in which the synchronizing mechanism of FIGS. 3 and 4 operate. In FIGS. 5a–5d the main body of the gripper assembly has been cut away in order to better depict the jaw guides and the pistons. Also the cover has been removed in order to display the movement of the synchronizing elements 40 and 41. As shown, the jaw members 13 and 14 are progressively further away from the main body 1 as FIGS. 5a–5d progress, so that FIG. 5a depicts the jaw members in a closed position and FIG. 5d depict the jaw members in an open position. As shown in FIG. 5a when the jaw members 13 and 14 are in their closed position, the synchronizer elements 40 and 41 can be slightly open or extended. As the jaw members 13 and 14 begin opening, the outer 40 and inner 41 synchronizing elements can slide toward each other until the inner synchronizing element 41 abuts the outer synchronizing element 40 (FIG. 5b) in their nested position. Thereafter, as the jaw members 13 and 14 continue to open, the outer 40 and inner 41 synchronizing elements slide away from each other until they are fully extended as shown in FIG. 5d. As the jaw members 13 and 14 close, the stages of operation of the synchronizing elements 40 and 41 are reversed from FIG. 5d through FIG. 5a.

Figure 6:
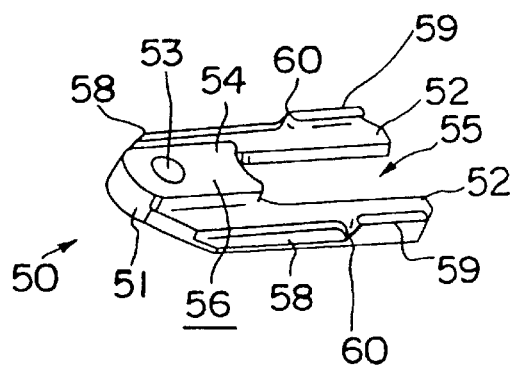
FIG. 6 is a perspective view of a synchronizing element according to another embodiment of the present invention.

FIG. 6 is a perspective view of a synchronizing element according to another embodiment of the present invention. The synchronizing element 50 depicted in FIG. 6 is designed to mate with an identically shaped synchronizing element. Accordingly, rather than require two different, e.g. an inner and an outer synchronizing element as depicted in FIGS. 3–5d, a synchronizing assembly according to this embodiment of the present invention can use two identical synchronizing element. This design reduces manufacturing costs and the number of different parts required to build a synchronized gripper assembly.

Figure 7:
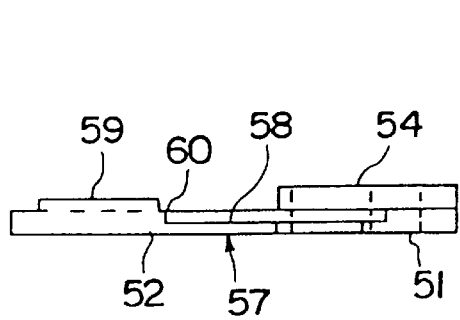
FIG. 7 is a side view of the synchronizing element of FIG. 6.
Figure 8:
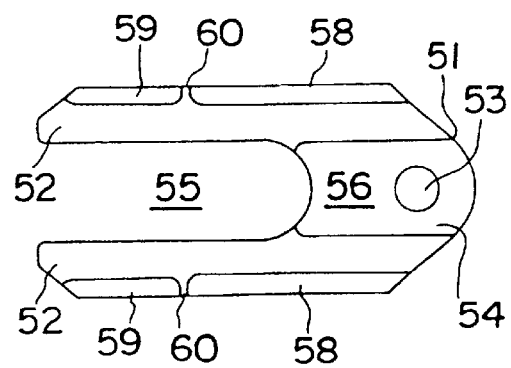
FIG. 8 is a top view of the synchronizing element of FIG. 6.

FIG. 7 is a side view of the synchronizing element of FIG. 6. FIG. 8 is a top view of the synchronizing element of FIG. 6. The synchronizing element of FIGS. 6–8 includes a base 51 and two arms 52 which extend outwardly from the base 51. The base 51 includes a through-hole 53 that is used to couple the synchronizing element to a pin or other coupling structure or element provided on a jaw guide, as discussed above in reference to FIGS. 1–5d. The base 51 includes a raised central portion 54 that has parallel sides and a width which is approximately equal to the width of the open ended slot 55 formed between the inner opposed surfaces of the arm 52. The thickness of raised central portion 54 is approximately equal to twice the thickness of the arms 52 so that when two of the synchronizing elements are coupled together with one reversely orientated the upper surface 56 of one raised central portion 54 is substantially coplanar with the lower surface 57 of the opposite synchronizing element. Also, when coupled together, the raised central portion of one synchronizing element is received in the open ended slot of the other synchronizing element.

The arms 52 of the synchronizing element have peripheral recessed edge portions 58 and peripheral raised edge portions 59 which can be configured as depicted so that when two of the synchronizing elements are coupled together as described above, the peripheral raised edge portions 59 of one are received in the peripheral recessed edge portions 58 of the other. This manner of coupling the synchronizing elements together maintains parallel alignment of the coupled synchronizing elements. In addition, the stepped portions 60 between the raised peripheral edge portions 59 and the recessed peripheral edge portions 58 can abut one another on coupled synchronizing elements to limit how far the coupled synchronizing element can move outward from one another.

It is noted that the design of the synchronizing elements described above and depicted in FIGS. 6–8 provide for a number of contact surfaces which insure proper parallel alignment and smooth sliding motion between the coupled synchronizing elements. In order to increase the integrity of the synchronizing elements, cross-supports which bridge the otherwise open ended slots can be included. Such cross-supports can ensure that the arms of the synchronizing elements do not spread apart.

FIGS. 9a–12b are perspective views of alternative synchronizing elements according to the present invention. Each of the synchronizing elements of FIGS. 9a–12b include sliding elements which increase the length of travel of the synchronizing elements.

Figure 9A:
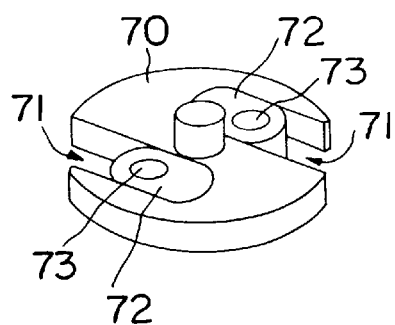
FIGS. 9a–12b are perspective views of alternative synchronizing elements according to the present invention.
Figure 9B:
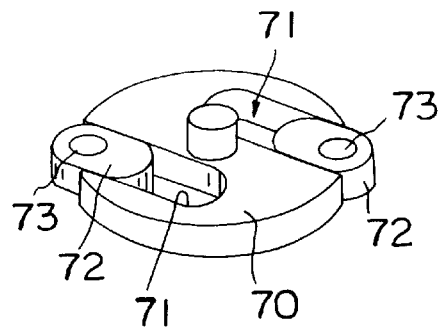

FIGS. 9a and 9b depict a synchronizing element which includes a rotatable disk 70 having two parallel open ended slots 71. The open ended slots 71 receive shuttle elements 72 that are configured in the open ended slots 71. The shuttle elements 72 have through-holes 73 by which they can be coupled to pins or other coupling structure or elements provided in jaw guides as described above. FIG. 9a depicts the synchronizing element in a closed position and FIG. 9b depicts the synchronizing element in an open position.

Figure 10A:
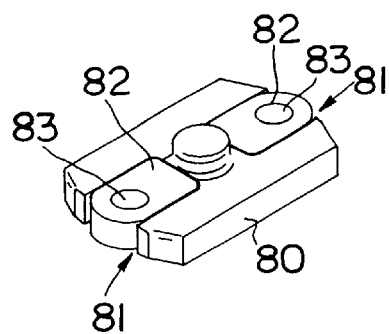
Figure 10B:
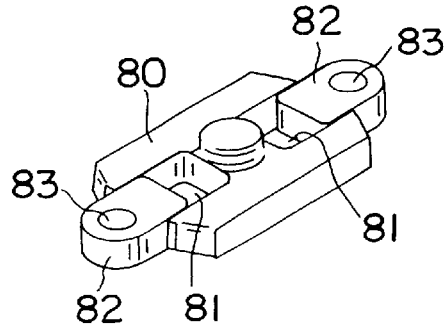

FIGS. 10a and 10b depict a synchronizing element which includes a rotatable body 80 having two axially aligned open ended slots 81 at opposed ends thereof. The open ended slots 81 receive shuttle elements 82 that are configured in the open ended slots 81. The shuttle elements 82 have through-holes 83 by which they can be coupled to pins provided in jaw guides as described above. FIG. 10a depicts the synchronizing element in a closed position and FIG. 10b depicts the synchronizing element in an open position.

Figure 11A:
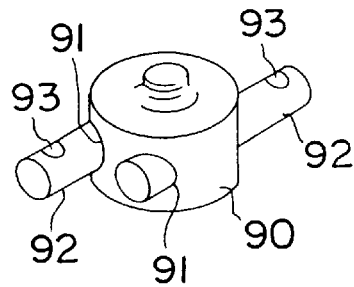
Figure 11B:
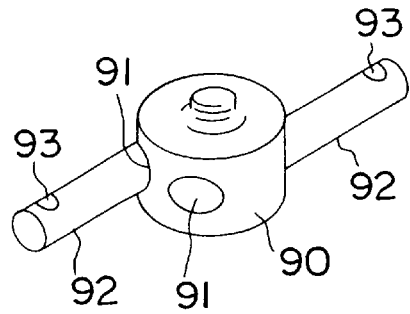

FIGS. 11a and 11b depict a synchronizing element which includes a hub 90 having two parallel through-holes 91 therein. The through-holes 91 receive shuttle elements 92 that comprise elongate members that are configured to slide in through-holes 91. The shuttle elements 92 have through-holes 93 by which they can be coupled to pins provided in jaw guides as described above. FIG. 11a depicts the synchronizing element in a closed position and FIG. 11b depicts the synchronizing element in an open position.

Figure 12A:
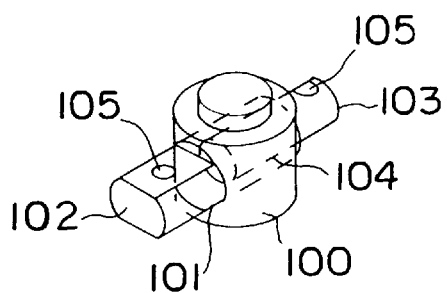
Figure 12B:
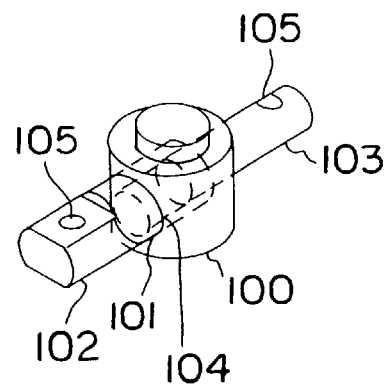

FIGS. 12a and 12b depict a synchronizing element which includes a hub 100 having a centrally located through-hole 101 therein. The through-hole 101 receives a pair of telescopic shuttle elements that comprise an outer elongate member 102 and an inner elongate member 103 that is received in a bore 104 of the outer elongate member 102. The outer elongate member 102 is configured to slide within through-hole 101 provided in hub 100 and the inner elongate member 103 is configured to slide within bore 104 of outer elongate member 102. The shuttle elements include through-holes 105 by which they can be coupled to pins provided in jaw guides as described above. FIG. 12a depicts the synchronizing element in a closed position and FIG. 12b depicts the synchronizing element in an open position.

The synchronizing elements of the present invention can be made of any suitable durable material, including metals and plastics, and can be used in conjunction with various parallel gripper and clamp devices.

The synchronizing mechanisms of the present invention are not limited for use with clamps or gripper devices which include jaw guides or pistons that are parallel to one another. In this regard, it is within the scope of the invention to use the synchronizing mechanisms in conjunction with non-parallel jaw guides and/or non-parallel pistons.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed is:

1. A gripper assembly comprising:

a body;

at least two pistons provided within a chamber within the body for opposed reciprocal movement therein;

a pair of opposed jaw members, said each jaw member located at opposite ends of the body and each coupled to one of the at least two pistons for reciprocal movement between open and closed positions;

first and second longitudinally extending jaw guide members, wherein the first jaw guide member is positioned substantially parallel to the second jaw guide member, and wherein the first jaw guide member is movable along an axis that extends substantially parallel to the second jaw guide member;

wherein the first and second longitudinally extending jaw guide members, each comprises a pin attached thereto; and a synchronizing member located in a cavity formed in the body, wherein the synchronizing member is movable about an axis, and wherein the synchronizing member is separated from the first and second jaw guide members by a partition, and wherein the synchronizing member is in operable communication with each of the pins which extend into the cavity.

2. A gripper assembly according to claim 1, further comprising at least two additional jaw guide members which are coupled separately to each of the pair of opposed jaw members.

3. A gripper assembly comprising:

a housing having a chamber disposed therein;

at least one piston located within the chamber for opposed reciprocal movement therein;

a pair of opposed jaw members located at opposite ends of the housing and said each jaw member coupled to one of the at least one piston for reciprocal movement therewith between open and closed positions;

two elongate jaw guides each one coupled to one of the pair of opposed jaw members and said each jaw guide movable along one of two spaced apart, parallel extending axis; and a synchronizing member comprising a single body having an outer periphery, the synchronizing member is configured to move about a pivot axis which is located between the two elongate jaw guides, the single body also having a pair of open-ended slots extending therein from the periphery, each of the slots is coaxially aligned with one another and each is located on opposite sides of the pivot axis and each is configured to receive one of a pair of links, each of the links is coupled to one of the two elongate jaw guides.

4. The gripper assembly of claim 3, wherein the synchronizing member comprises two slots each configured to receive one of the links.

5. The gripper assembly of claim 4, wherein said each slot is formed on opposite ends of the synchronizing element.

6. The gripper assembly of claim 3, wherein the links are pins such that one end of each of the pins is received in one of the openings and the opposite end of each of the pins is coupled to one of the two elongate jaw members.

7. The gripper assembly of claim 6, wherein said each pin extends perpendicular relative to the two elongate jaw guides and the synchronizing member is positioned perpendicular relative to the pins.

\* \* \* \* \*